(12) United States Patent
Matsugi

(10) Patent No.: US 7,327,479 B2
(45) Date of Patent: Feb. 5, 2008

(54) INFORMATION MANAGEMENT DEVICE FOR PRINTING APPARATUS AND INFORMATION MANAGEMENT METHOD

(75) Inventor: Hironori Matsugi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 1081 days.

(21) Appl. No.: 10/425,029

(22) Filed: Apr. 29, 2003

(65) Prior Publication Data

US 2004/0070781 A1 Apr. 15, 2004

(30) Foreign Application Priority Data

Apr. 30, 2002 (JP) .............................. 2002-128617
Apr. 25, 2003 (JP) .............................. 2003-122967

(51) Int. Cl.
*G06F 3/12* (2006.01)
*G06F 15/00* (2006.01)
*G06F 17/00* (2006.01)
*B41F 1/00* (2006.01)
*G06K 1/00* (2006.01)

(52) U.S. Cl. ................ 358/1.14; 358/1.1; 358/1.15; 358/1.16; 358/1.13; 358/1.6; 101/487; 101/494; 101/488; 101/483; 101/248; 400/76

(58) Field of Classification Search ............... 358/1.14, 358/1.1, 1.15, 1.13, 1.16; 400/76; 101/487, 101/494, 488, 483, 248
See application file for complete search history.

(56) References Cited

U.S. PATENT DOCUMENTS 6,208,428 B1 * 3/2001 Chihara et al. ............ 358/1.15
6,535,294 B1 * 3/2003 Arledge et al. ............ 358/1.15
6,597,469 B1 * 7/2003 Kuroyanagi ............... 358/1.15
6,865,620 B2 * 3/2005 Homma ....................... 710/19
6,921,220 B2 * 7/2005 Aiyama ....................... 400/76
6,956,666 B2 * 10/2005 Tanaka ...................... 358/1.15
6,973,514 B2 * 12/2005 Yamaguchi .................. 710/72
7,034,952 B2 * 4/2006 Okuda et al. ............. 358/1.15
7,170,618 B2 * 1/2007 Fujitani et al. ............ 358/1.15
2001/0024294 A1 * 9/2001 Tanaka ...................... 358/1.15
2002/0063887 A1 * 5/2002 White ........................ 358/1.15
2002/0073003 A1 * 6/2002 Levine ....................... 705/30
2002/0196452 A1 * 12/2002 Komiya ...................... 358/1.1
2003/0020951 A1 * 1/2003 Minowa et al. ........... 358/1.15
2003/0053124 A1 * 3/2003 Iijima et al. ............... 358/1.15
2003/0133147 A1 * 7/2003 Peeters ...................... 358/1.15

* cited by examiner

*Primary Examiner*—Twyler Lamb
*Assistant Examiner*—Pawandeep S Dhingra
(74) *Attorney, Agent, or Firm*—Sughrue Mion, PLLC

(57) ABSTRACT

The technique of the present invention reads job management data including an ID allocated to a printing apparatus receiving each print job and an ID allocated to a printing apparatus executing the print job from each of printing apparatuses 50a and 50b at regular intervals. The technique calculates profit distributions, cost distributions, and charge distributions at preset division rates to the printing apparatus receiving each print job and the printing apparatus executing the print job, based on the job management data. The technique then notifies each printing apparatus or each administrator of printing apparatuses of the calculated profit distributions, cost distributions, and charging distributions.

26 Claims, 5 Drawing Sheets

FIG.3

EXPENDABLE CONSUMPTION DATA

| Printing Apparatus ID | JA0050a |
|---|---|
| Jurisdiction Management Server ID | CA0040 |
| Data Acquisition Date | Month, Day, Year |
| Printer ID | P*****1 |
| Printer ID | P*****2 |
| Consumption of Paper (A4/L) | *** |
| Consumption of Paper (A4/M) | *** |
| Consumption of Paper (A3/L) | *** |
| Consumption of Paper (A3/M) | *** |
| Stock of Ink Cartridge (B) | ** |
| Stock of Ink Cartridge (C) | ** |
| Stock of Ink Cartridge (M) | ** |
| Stock of Ink Cartridge (Y) | ** |

FIG.4

JOB MANAGEMENT DATA

| Printing Apparatus ID | JA0050a |
|---|---|
| Jurisdiction Management Server ID | CA0040 |
| Job Reception Date | Month, Day, Year |
| Job Receipt Number | JOB * * * * |
| Job Reception Apparatus ID | JA0050a |
| Job Execution Apparatus ID | JA0050b |
| Paper Size | A4 |
| Print Size | A4 |
| Paper Type | Glossy A |
| Ink Type | Pigment Ink |
| Job Execution Due Date | Month, Day, Year |
| Job Execution Date | Month, Day, Year |

INFORMATION MANAGEMENT DEVICE FOR PRINTING APPARATUS AND INFORMATION MANAGEMENT METHOD

BACKGROUND OF THE INVENTION

1. Field of the Invention

The present invention relates to an information management device for printing apparatuses and a corresponding information management method. More specifically the invention pertains to an information management device for printing apparatuses, which receive expendable consumption information regarding an expendable consumed by multiple printing apparatuses to manage a consumption status of the expendable in the multiple printing apparatuses, where the multiple printing apparatuses are located at different places and are capable of receiving a print job and of transferring the received print job via a communication line for execution, as well as to a corresponding information management method.

2. Description of the Prior Art

A diversity of information management devices have been proposed to input the number of copies from each copy machine connecting with the information management device via a communication line and to calculate a charge for the copies. The prior art information management device inputs the number of copies from each copy machine every month, calculates the charge for the copies, and sends the charge to an administrator of the copy machine.

The prior art information management device is capable of charging the use of images by each copy machine, but fails in charging the use of images when an image is input into one copy machine and is output by another copy machine, which is connected with the image-inputting copy machine via a communication line.

SUMMARY OF THE INVENTION

The object of the present invention is thus to provide an information management device for printing apparatuses and a corresponding information management method, which automatically adjust profit distribution when the printing apparatus executing each print job is different from the printing apparatus receiving the print job. The object of the invention is also to provide an information management device and a corresponding information management method, which automatically adjust cost distribution of an expendable when the printing apparatus executing each print job is different from the printing apparatus receiving the print job. The object of the present invention is further to provide an information management device and a corresponding information management method, which automatically adjust charge distribution when the printing apparatus executing each print job is different from the printing apparatus receiving the print job.

In order to achieve at least a part of the aforementioned objects, an information management device for a printing apparatus and a corresponding information management method of the present invention are structured as follows.

A first information management device for a printing apparatus is a device receiving expendable consumption information regarding an expendable consumed by multiple printing apparatuses to manage a consumption status of the expendable in the multiple printing apparatuses, the multiple printing apparatuses being located at different places and being capable of receiving a print job and of transferring the received print job via a communication line for execution, the information management device including a job information storage module that receives and stores job reception information regarding reception of print jobs by the multiple printing apparatuses, job execution information regarding execution of print jobs by the multiple printing apparatuses, and job details information regarding details of the print jobs received by the multiple printing apparatuses; a profit distribution calculation module that calculates a reception-side profit distribution as a division of a profit produced by execution of each print job to an administrator of a printing apparatus receiving the print job and an execution-side profit distribution as a division of the profit to an administrator of a printing apparatus executing the print job at a preset profit ratio, based on the job reception information, the job execution information, and the job details information; and a profit distribution notification module that notifies each corresponding printing apparatus of the calculated reception-side profit distribution and the calculated execution-side profit distribution.

The first information management device of the present invention receives the job reception information regarding reception of print jobs by the multiple printing apparatuses, the job execution information regarding execution of print jobs by the multiple printing apparatuses, and the job details information regarding details of the print jobs received by the multiple printing apparatuses. The first information management device calculates the reception-side profit distribution as the division of the profit produced by execution of each print job to the administrator of the printing apparatus receiving the print job and the execution-side profit distribution as the division of the profit to the administrator of the printing apparatus executing the print job, based on the job reception information, the job execution information, and the job details information, and notifies each corresponding printing apparatus of the calculated reception-side profit distribution and the calculated execution-side profit distribution. This arrangement ensures automatic adjustment of the profit distribution when the printing apparatus executing each print job is different from the printing apparatus receiving the print job.

In the first information management device of the present invention, as one aspect, a profit distribution calculation module may carry out the calculation with regard to each administrator of the respective printing apparatuses at preset time intervals. The first information management device may include a supply instruction output module that outputs a supply instruction of the expendable to the multiple printing apparatuses, based on the received expendable consumption information.

The first information management device of the present invention, as another aspect, may include a cost distribution calculation module that calculates a reception-side cost distribution as a division of a cost of the expendable consumed by execution of each print job to the administrator of the printing apparatus receiving the print job and an execution-side cost distribution as a division of the cost to the administrator of the printing apparatus executing the print job at a preset cost ratio, based on the job reception information, the job execution information, and the job details information, and a cost distribution notification module that notifies each corresponding printing apparatus of the calculated reception-side cost distribution and the calculated execution-side cost distribution. In this case, the cost distribution calculation module may carry out the calculation with regard to each administrator of the respective printing apparatuses at preset time intervals.

A second information management device for a printing apparatus of the present invention is a device receiving expendable consumption information regarding an expendable consumed by multiple printing apparatuses to manage charging to the multiple printing apparatuses, the multiple printing apparatuses being located at different places and being capable of receiving a print job and of transferring the received print job via a communication line for execution, the information management device including a job information storage module that receives and stores job reception information regarding reception of print jobs by the multiple printing apparatuses, job execution information regarding execution of print jobs by the multiple printing apparatuses, and job details information regarding details of the print jobs received by the multiple printing apparatuses; a charging calculation module that calculates a reception-side charge as charging to an administrator of a printing apparatus receiving each print job and an execution-side charge as charging to an administrator of a printing apparatus executing the print job at a preset charging rate, based on the job reception information, the job execution information, and the job details information; and a charging notification module that notifies each corresponding printing apparatus of the calculated reception-side charge and the calculated execution-side charge.

The second information management device of the present invention receives the job reception information regarding reception of print jobs by the multiple printing apparatuses, the job execution information regarding execution of print jobs by the multiple printing apparatuses, and the job details information regarding details of the print jobs received by the multiple printing apparatuses. The second information management device calculates a reception-side charge as charging to an administrator of a printing apparatus receiving each print job and an execution-side charge as charging to an administrator of a printing apparatus executing the print job at a preset charging rate, based on the job reception information, the job execution information, and the job details information, and notifies each corresponding printing apparatus of the calculated reception-side charge and the calculated execution-side charge. This arrangement ensures automatic adjustment of the charging when the printing apparatus executing each print job is different from the printing apparatus receiving the print job.

In the second information management device of the present invention, as one aspect, a charging calculation module may carry out the calculation with regard to each administrator of the respective printing apparatuses at preset time intervals. The second information management device may include a supply instruction output module that outputs a supply instruction of the expendable to the multiple printing apparatuses, based on the received expendable consumption information.

The technique of the present invention is not restricted to the information management device for printing apparatuses, but is also applicable to an information management method for printing apparatuses.

BRIEF DESCRIPTION OF THE DRAWINGS

FIG. 3 shows an example of the expendable consumption data;

FIG. 4 shows an example of the job management data;

DESCRIPTION OF THE PREFERRED EMBODIMENTS

Figure 1:
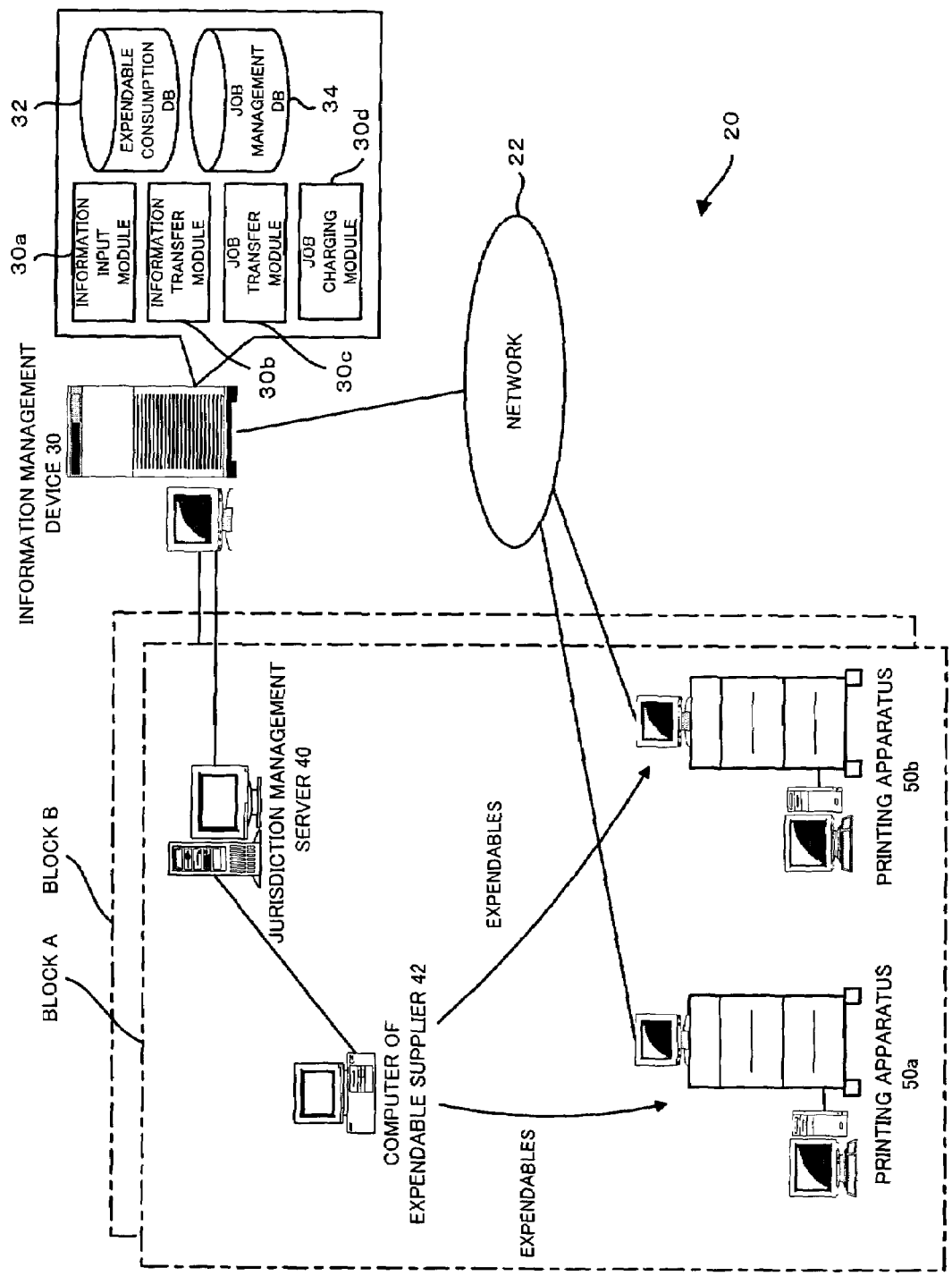
FIG. 1 schematically illustrates the construction of a printing management system 20 including an information management device 30 in one embodiment of the invention.

One preferred embodiment of the present invention is discussed below. FIG. 1 schematically illustrates the construction of a printing management system 20 including an information management device 30 in one embodiment of the invention. As illustrated, the information management device 30 of the embodiment includes an information input module 30a that acquires data regarding consumption of expendables (hereafter referred to as expendable consumption data) and data used for management of print jobs (hereafter referred to as job management data) from multiple printing apparatuses 50a and 50b, which connect with the information management device 30 via a network 22, at regular intervals, and an information transfer module 30b that transfers the expendable consumption data to a jurisdiction management server 40, which manages supplies of expendables used in the multiple printing apparatuses 50a and 50b. The information management device 30 also includes a job transfer module 30c that transfers images to be printed to the printing apparatuses, which actually execute print jobs, based on the job management data, a job charging module 30d that calculates charges for reception and execution of the print jobs and notifies respective photo studios, at which the printing apparatuses 50a and 50b are located, of the calculated charges, an expendable consumption database 32 that stores the expendable consumption data in the form of a database, and a job management database 34 that stores the job management data in the form of a database.

The jurisdiction management server 40 functions to manage supplies of expendables for the printing apparatuses 50a and 50b, which are located at a photo studio in each of geographical blocks (for example, a block A and a block B in the drawing). The jurisdiction management server 40 outputs a supply instruction to a computer 42 of an expendable supplier, which supplies expendables, such as printing papers and printing inks, used at the photo studio to keep predetermined stocks, based on the expendable consumption data transferred from the information management device 30. The series of processing executed by the jurisdiction management server 30 is not the essential part of the present invention and is not described in detail here. The following describes the series of processing executed by the information management device 30 of the embodiment.

Figure 2:
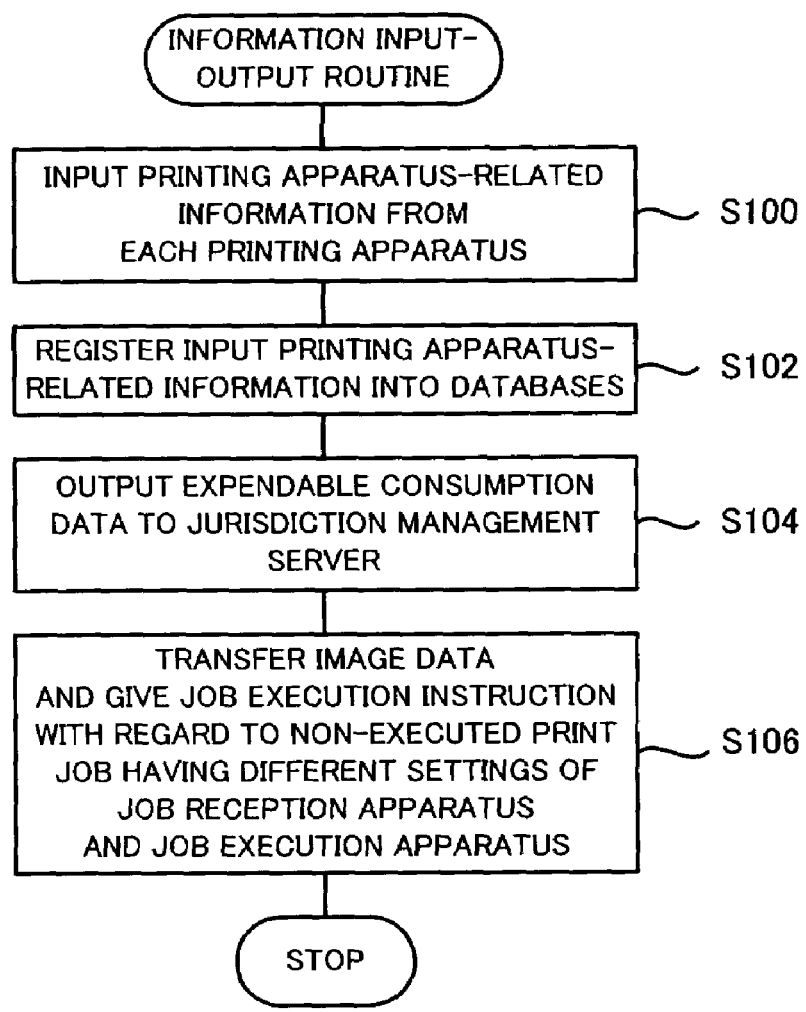
FIG. 2 is a flowchart showing an information input-output routine executed by the information management device 30 of the embodiment.

FIG. 2 is a flowchart showing an information input-output routine executed by the information management device 30 of the embodiment. This information input-output routine is carried out iteratively at preset time intervals (for example, at every 12 hours). When the program enters the information input-output routine, the information management device 30 of the embodiment first inputs printing apparatus-related information including the expendable consumption data and the job management data from each of the printing apparatuses 50a and 50b in all blocks connecting with the information management device 30 via the network 22 (step S100). FIG. 3 shows an example of the expendable consumption data, and FIG. 4 shows an example of the image-related data. As shown in FIG. 3, the expendable consumption data of the embodiment includes a printing apparatus ID allocated to each printing apparatus, a jurisdiction management server ID allocated to each jurisdiction management server, a data acquisition date as the information input date from the printing apparatus, a printer ID allocated to each printer incorporated in the printing apparatus, a consumption of each printing paper, and a stock of each ink cartridge in each color used for printing. As shown in FIG. 4, the job management data includes the printing apparatus ID, the jurisdiction management server ID, a job reception date when a pint job is received, a job receipt number assigned to the received print job, a job reception apparatus ID as an ID allocated to the printing apparatus that receives the print job, a job execution apparatus ID as an ID allocated to the printing apparatus that executes the received print job, a job execution due date as an execution due date of the received print job, and a job execution date as a date when the received print job is executed by the job execution apparatus. The print job may be received by one of the printing apparatuses 50a and 50b and executed by the same printing apparatus 50a or 50b. In this case, an identical ID is set to the job reception apparatus ID and the job execution apparatus ID. The print job may alternatively be received by one of the printing apparatuses 50a and 50b and executed by the different printing apparatus 50b or 50a. The printing apparatus used to execute the print job is specified, when the print job is received by one of the printing apparatuses. In this case, the job execution apparatus ID is set according to the specification of the printing apparatus used to execute the print job. In the example of FIG. 4, the job management data shows that the print job is received by the printing apparatus 50a (see FIG. 1) and is executed by the different printing apparatus 50b. In the case where the printing apparatus receiving the print job is different from the printing apparatus executing the print job, transfer of print data as a print object is required. The transfer process will be discussed later.

After the input of the printing apparatus-related information, the information management device 30 registers the expendable consumption data of the input printing apparatus-related information into the expendable consumption database 32, while registering the job management data into the job management database 34 (step S102). In the case where this information input-output routine is executed before the received print job is actually executed, the job execution data has no entry in the job management data. The registration into the job management data base 34 accordingly registers only the job execution date with regard to the existing data with no entry of the job execution date, while registering all entries with regard to new data.

On completion of the registration of the printing apparatus-related information into the expendable consumption database 32 and into the job management database 34, the registered expendable consumption data are output to the jurisdiction management server 40 having an allocated ID identical with the input jurisdiction management server ID (step S104). As mentioned previously, the jurisdiction management server 40 receives the expendable consumption data from the information management device 30 and manages supplies of expendables by the expendable supplier to the respective photo studios, where the printing apparatuses are located, in the block under jurisdiction, based on the received expendable consumption data.

With regard to a non-executed print job having different settings in the job reception apparatus ID and the job execution apparatus ID among the registered job management data, the information management device 30 gives an image data transfer instruction to the printing apparatus receiving the print job to transfer image data to the printing apparatus executing the print job, transfers the corresponding job management data to the printing apparatus executing the print job, and gives an instruction of executing the print job to the printing apparatus executing the print job (step S106). The program then exits from the information input-output routine. The printing apparatus receiving the image data transfer instruction transfers the specified image data via the network 22 to the printing apparatus executing the print job. The printing apparatus receiving the transferred image data and the transferred job management data accepts the print job to be executed on or before the specified job execution due date and actually executes the print job.

Figure 5:
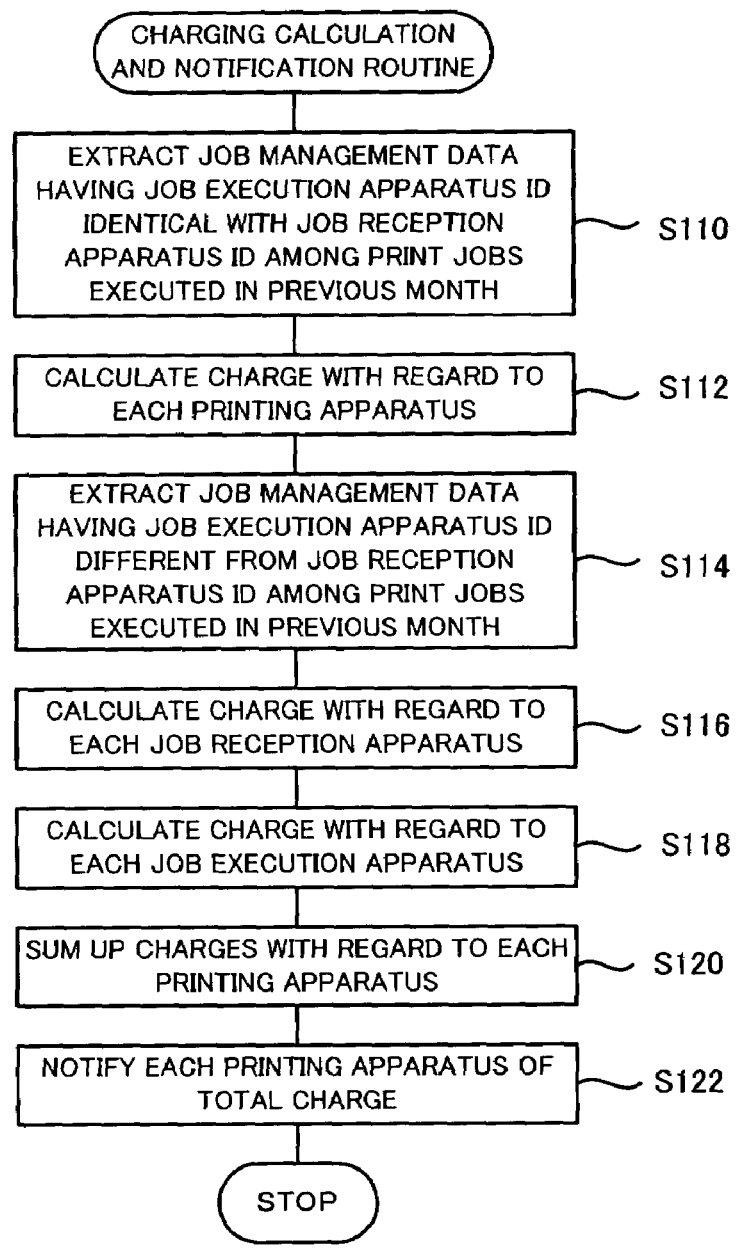
FIG. 5 is a flowchart showing a charging calculation and notification routine executed by the information management device 30 of the embodiment.

FIG. 5 is a flowchart showing a charging calculation and notification routine executed by the information management device 30 of the embodiment. This routine is carried out on the $1^{st}$ day of every month. When the program enters the charging calculation and notification routine, the information management device 30 of the embodiment first extracts the job management data having the identical settings in the job reception apparatus ID and the job execution apparatus ID among print jobs executed in a previous month from the job management database 34 (step S110), and calculates a charge for execution of print jobs with respect to each of the printing apparatuses, based on the extracted job management data (step S112). The concrete procedure reads a charge corresponding to the paper size, the paper type, and the ink type included in the job management data from a preset charge map. For example, a charge of XX yen is set in advance for printing on a size A4 of glossy paper A with a pigment ink and is stored in the charge map. The amount of money corresponding to the size A4, the glossy A, and the pigment ink as the paper size, the paper type, and the ink type of the job management data is accordingly read from the charge map.

The information management device 30 subsequently extracts the job management data having the different settings in the job reception apparatus ID and the job execution apparatus ID among the print jobs executed in the previous month from the job management database 34 (step S114), and calculates a charge as each job reception apparatus and a charge as each job execution apparatus, based on the extracted job management data (steps S116 and S118). The charge as each job reception apparatus is calculated with respect to the printing apparatus having an allocated ID identical with the job reception apparatus ID included in the job management data having the different settings in the job reception apparatus ID and the job execution apparatus ID. The charge as each job execution apparatus is calculated with respect to the printing apparatus having an allocated ID identical with the job execution apparatus ID included in the job management data having the different settings in the job reception apparatus ID and the job execution apparatus ID. In the procedure of this embodiment, the calculation of such charges has two additional functions, distribution of a profit produced by execution of each print job and distribution of a cost of expendables consumed by execution of the print job, on the assumption that print jobs are transferred between photo studios managed by different owners. The profit produced by execution of each print job is calculated according to the details of the print job, such as the size and the type of printing paper and the type of ink. For example, the profit produced by execution of each print job may be distributed at preset rates as 50% each or as 60% and 40% to the job reception apparatus and the job execution apparatus. The cost of expendables consumed by execution of the print job may be distributed at preset rates as 50% each or as 40% and 60% to the job reception apparatus and the job execution apparatus. The distribution of the charge for reception and execution of each print job by an identical printing apparatus is also calculated with regard to the job management data having the identical settings in the job reception apparatus ID and the job execution apparatus ID. For example, the charge for execution of each print job is calculated according to the details of the print job, such as the size and the type of printing paper and the type of ink and is distributed at preset rates as 50% each, as 40% and 60%, or as 60% and 40% to the job reception apparatus and the job execution apparatus. The concrete procedure calculates the total of the distribution of the profit, the distribution of the cost, and the distribution of the charge for execution of the print job as the job reception apparatus and the total of the distribution of the profit, the distribution of the cost, and the distribution of the charge for execution of the print job as the job execution apparatus at the preset rates with regard to each printing apparatus.

After calculation of the charges, the information management device 30 sumps up the three calculated charges, that is, the charge for reception and execution of each print job by the identical printing apparatus, the charge as the job reception apparatus, and the charge as the job execution apparatus with regard to each printing apparatus (step S120) and notifies the corresponding printing apparatus of the total charge (step S122). The program then exits from the charging calculation and notification routine. The printing apparatus is notified of the breakdown of the three types of charges. The notification may be implemented by simple transfer of data, by creation and transmission of an electronic document, or by any other suitable technique.

As described above, the information management device 30 of this embodiment automatically adjusts distributions of the profit, the cost, and the charge, even when the printing apparatus receiving one print job and the printing apparatus executing the print job are managed by different owners. The information management device 30 notifies each corresponding printing apparatus of the breakdown of the three types of charges, that is, the charge for reception and execution of each print job by the identical printing apparatus, the charge as the job reception apparatus, and the charge as the job execution apparatus. The printing apparatus is thus informed of the breakdown of the charging.

The information management device 30 of the embodiment calculates the distribution of the profit produced by execution of each print job, the distribution of the cost of expendables consumed by execution of the print job, and the distribution of the charge for execution of the print job in the process of calculating the charge as each job reception apparatus and the charge as each job execution apparatus. One possible modification may calculate only the distribution of the profit produced by execution of each print job and the distribution of the charge for execution of the print job. Another possible modification may calculate only the distribution of the cost of expendables consumed by execution of each print job and the distribution of the charge for execution of the print job. Still another possible modification may calculate the distribution of the profit produced by execution of each print job and the distribution of the cost of expendables consumed by execution of the print job, instead of calculation of the charge. Another possible modification may calculate only the distribution of the profit produced by execution of each print job.

The information management device 30 of the embodiment calculates the charging with regard to each printing apparatus. One possible modification may calculate the charging with regard to each administrator of printing apparatuses. This modified procedure calculates the charging with regard to each printing apparatus and compiles the calculated charges with respect to multiple printing apparatuses managed by the same administrator.

The information management device 30 of the embodiment executes the charging calculation and notification routine on the $1^{st}$ day of every month. The date of calculation and notification of the charging is, however, not restricted to the $1^{st}$ day but may be any day of the month, when the processing is executed at the frequency of once a month. The charging calculation and notification routine may be carried out at any other suitable frequency, for example, once every two months.

With regard to a non-executed print job having different settings in the job reception apparatus ID and the job execution apparatus ID, the information management device 30 of the embodiment gives an image data transfer instruction to the printing apparatus receiving the print job to transfer image data to the printing apparatus executing the print job, transfers the corresponding job management data to the printing apparatus executing the print job, and gives an instruction of executing the print job. In one modified structure, the printing apparatus receiving the print job may transfer the image data and the corresponding job management data to the printing apparatus executing the print job and give an instruction of executing the print job.

The information management device 30 of the embodiment notifies each printing apparatus of the total charge via the network 22. The administrator of printing apparatuses may alternatively be notified of the total charge by post or by another suitable technique.

In the above embodiment, the technique of the present invention is applied to the information management device 30 that manages information of multiple printing apparatuses. The technique of the invention is also applicable to an information management method described above in relation to the information management device 30 of the embodiment. Another application is a program that causes the computer to function as the information management device 30 of the embodiment. Still another application is a program that causes the computer to execute the respective steps of the information management method described above in relation to the information management device 30 of the embodiment. In the case of such programs, the respective steps of the information input-output routine shown in FIG. 2 and the charging calculation and notification routine shown in FIG. 5 may be programmed in a suitable programming language.

The above embodiment is to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

What is claimed is:

1. An information management device for a printing apparatus, said information management device receiving expendable consumption information regarding an expendable consumed by multiple printing apparatuses to manage a consumption status of the expendable in the multiple printing apparatuses, the multiple printing apparatuses being located at different places and being capable of receiving a print job and of transferring the received print job via a communication line for execution, said information management device comprising:
  a job information storage module that receives and stores job reception information regarding reception of print jobs by the multiple printing apparatuses, job execution information regarding execution of print jobs by the multiple printing apparatuses, and job details information regarding details of the print jobs received by the multiple printing apparatuses;
  a profit distribution calculation module that calculates a reception-side profit distribution as a division of a profit produced by execution of each print job to an administrator of a printing apparatus receiving the print job and an execution-side profit distribution as a division of the profit to an administrator of a printing apparatus executing the print job at a preset profit ratio, based on the job reception information, the job execution information, and the job details information; and
  a profit distribution notification module that notifies each corresponding printing apparatus of the calculated reception-side profit distribution and the calculated execution-side profit distribution.

2. An information management device in accordance with claim 1, wherein said profit distribution calculation module carries out the calculation with regard to each administrator of the respective printing apparatuses at preset time intervals.

3. An information management device in accordance with claim 1, wherein the job reception information includes job reception apparatus identification information for identifying a printing apparatus receiving each print job,
  the job execution information includes job execution apparatus identification information for identifying a printing apparatus executing each print job,
  the job details information includes at least one of a size of printing paper, a type of printing paper, and a type of ink, and
  said profit distribution calculation module calculates the reception-side profit distribution, based on at least one of the size of printing paper, the type of printing paper, and the type of ink used for print jobs received with regard to each piece of the job reception apparatus identification information, while calculating the execution-side profit distribution, based on at least one of the size of printing paper, the type of printing paper, and the type of ink used for print jobs executed with regard to each piece of the job execution apparatus identification information.

4. An information management device in accordance with claim 1, said information management device further comprising:
  a cost distribution calculation module that calculates a reception-side cost distribution as a division of a cost of the expendable consumed by execution of each print job to the administrator of the printing apparatus receiving the print job and an execution-side cost distribution as a division of the cost to the administrator of the printing apparatus executing the print job at a preset cost ratio, based on the job reception information, the job execution information, and the job details information; and
  a cost distribution notification module that notifies each corresponding printing apparatus of the calculated reception-side cost distribution and the calculated execution-side cost distribution.

5. An information management device in accordance with claim 4, wherein said cost distribution calculation module carries out the calculation with regard to each administrator of the respective printing apparatuses at preset time intervals.

6. An information management device in accordance with claim 4, wherein the job reception information includes job reception apparatus identification information for identifying a printing apparatus receiving each print job,
  the job execution information includes job execution apparatus identification information for identifying a printing apparatus executing each print job,
  the job details information includes the expendable consumed by printing, and
  said cost distribution calculation module calculates the reception-side cost distribution, based on the expendable consumed by printing of print jobs received with regard to each piece of the job reception apparatus identification information, while calculating the execution-side cost distribution, based on the expendable consumed by printing of print jobs executed with regard to each piece of the job execution apparatus identification information.

7. An information management device in accordance with claim 1, said information management device further comprising:
  a supply instruction output module that outputs a supply instruction of the expendable to the multiple printing apparatuses, based on the received expendable consumption information.

8. An information management device for a printing apparatus, said information management device receiving expendable consumption information regarding an expendable consumed by multiple printing apparatuses to manage charging to the multiple printing apparatuses, the multiple printing apparatuses being located at different places and being capable of receiving a print job and of transferring the received print job via a communication line for execution,
  said information management device comprising:
  a job information storage module that receives and stores job reception information regarding reception of print jobs by the multiple printing apparatuses, job execution information regarding execution of print jobs by the multiple printing apparatuses, and job details information regarding details of the print jobs received by the multiple printing apparatuses;
  a charging calculation module that calculates a reception-side charge as charging to an administrator of a printing apparatus receiving each print job and an execution-side charge as charging to an administrator of a printing apparatus executing the print job at a preset charging rate, based on the job reception information, the job execution information, and the job details information; and
  a charging notification module that notifies each corresponding printing apparatus of the calculated reception-side charge and the calculated execution-side charge.

9. An information management device in accordance with claim 8, wherein said charging calculation module carries out the calculation with regard to each administrator of the respective printing apparatuses at preset time intervals.

10. An information management device in accordance with claim 8, wherein the job reception information includes job reception apparatus identification information for identifying a printing apparatus receiving each print job,
  the job execution information includes job execution apparatus identification information for identifying a printing apparatus executing each print job, the job details information includes at least one of a size of printing paper, a type of printing paper, and a type of ink, and said charging calculation module specifies a job fee of each print job according to at least one of the size of printing paper, the type of printing paper, and the type of ink, calculates the reception-side charge based on a summation of products of job fees of respective print jobs received with regard to each piece of the job reception apparatus identification information and a preset reception-side division, and calculates the execution-side charge based on a summation of products of job fees of respective print jobs executed with regard to each piece of the job execution apparatus identification information and a preset execution-side division.

11. An information management device in accordance with claim 10, said information management device further comprising:

a profit distribution calculation module that calculates a reception-side profit distribution as a division of a profit produced by execution of each print job to the administrator of the printing apparatus receiving the print job and an execution-side profit distribution as a division of the profit to the administrator of the printing apparatus executing the print job at a preset profit ratio, based on the job reception information, the job execution information, and the job details information; and a cost distribution calculation module that calculates a reception-side cost distribution as a division of a cost of the expendable consumed by execution of each print job to the administrator of the printing apparatus receiving the print job and an execution-side cost distribution as a division of the cost to the administrator of the printing apparatus executing the print job at a preset cost ratio, based on the job reception information, the job execution information, and the job details information, wherein said charging calculation module calculates the reception-side charge based on a grand total of the calculated summation of the products of the job fees of the respective print jobs received with regard to each piece of the job reception apparatus identification information and the preset reception-side division, a sum of the reception-side profit distributions, and a sum of the reception-side cost distributions, while calculating the execution-side charge based on a grand total of the calculated summation of the products of the job fees of the respective print jobs executed with regard to each piece of the job execution apparatus identification information and the preset execution-side division, a sum of the execution-side profit distributions, and a sum of the execution-side cost distributions.

12. An information management device in accordance with claim 8, said information management device further comprising:

a supply instruction output module that outputs a supply instruction of the expendable to the multiple printing apparatuses, based on the received expendable consumption information.

13. An information management method for a printing apparatus, said information management method receiving expendable consumption information regarding an expendable consumed by multiple printing apparatuses to manage a consumption status of the expendable in the multiple printing apparatuses, the multiple printing apparatuses being located at different places and being capable of receiving a print job and of transferring the received print job via a communication line for execution, said information management method comprising the steps of:

(a) receiving job reception information regarding reception of print jobs by the multiple printing apparatuses, job execution information regarding execution of print jobs by the multiple printing apparatuses, and job details information regarding details of the print jobs received by the multiple printing apparatuses;

(b) calculating a reception-side profit distribution as a division of a profit produced by execution of each print job to an administrator of a printing apparatus receiving the print job and an execution-side profit distribution as a division of the profit to an administrator of a printing apparatus executing the print job at a preset profit ratio, based on the received job reception information, the job execution information, and the job details information; and (c) notifying each corresponding printing apparatus of the calculated reception-side profit distribution and the calculated execution-side profit distribution.

14. An information management method in accordance with claim 13, wherein said step (b) carries out the calculation with regard to each administrator of the respective printing apparatuses at preset time intervals.

15. An information management method in accordance with claim 13, wherein the job reception information includes job reception apparatus identification information for identifying a printing apparatus receiving each print job, the job execution information includes job execution apparatus identification information for identifying a printing apparatus executing each print job, the job details information includes at least one of a size of printing paper, a type of printing paper, and a type of ink, and said step (b) calculates the reception-side profit distribution, based on at least one of the size of printing paper, the type of printing paper, and the type of ink used for print jobs received with regard to each piece of the job reception apparatus identification information, while calculating the execution-side profit distribution, based on at least one of the size of printing paper, the type of printing paper, and the type of ink used for print jobs executed with regard to each piece of the job execution apparatus identification information.

16. An information management method in accordance with claim 13, said information management method further comprising the steps of:

(d) calculating a reception-side cost distribution as a division of a cost of the expendable consumed by execution of each print job to the administrator of the printing apparatus receiving the print job and an execution-side cost distribution as a division of the cost to the administrator of the printing apparatus executing the print job at a preset cost ratio, based on the job reception information, the job execution information, and the job details information; and (e) notifying each corresponding printing apparatus of the calculated reception-side cost distribution and the calculated execution-side cost distribution.

17. An information management method in accordance with claim 16, wherein said step (d) carries out the calculation with regard to each administrator of the respective printing apparatuses at preset time intervals.

18. An information management method in accordance with claim 16, wherein the job reception information includes job reception apparatus identification information for identifying a printing apparatus receiving each print job, the job execution information includes job execution apparatus identification information for identifying a printing apparatus executing each print job, the job details information includes the expendable consumed by printing, and said step (d) calculates the reception-side cost distribution, based on the expendable consumed by printing of print jobs received with regard to each piece of the job reception apparatus identification information, while calculating the execution-side cost distribution, based on the expendable consumed by printing of print jobs executed with regard to each piece of the job execution apparatus identification information.

19. An information management method in accordance with claim 13, said information management method further comprising the step of:

outputting a supply instruction of the expendable to the multiple printing apparatuses, based on the received expendable consumption information.

20. An information management method for a printing apparatus, said information management method receiving expendable consumption information regarding an expendable consumed by multiple printing apparatuses to manage charging to the multiple printing apparatuses, the multiple printing apparatuses being located at different places and being capable of receiving a print job and of transferring the received print job via a communication line for execution, said information management method comprising the steps of:

(a) receiving job reception information regarding reception of print jobs by the multiple printing apparatuses, job execution information regarding execution of print jobs by the multiple printing apparatuses, and job details information regarding details of the print jobs received by the multiple printing apparatuses;

(b) calculating a reception-side charge as charging to an administrator of a printing apparatus receiving each print job and an execution-side charge as charging to an administrator of a printing apparatus executing the print job at a preset charging rate, based on the received job reception information, the job execution information, and the job details information; and (d) notifying each corresponding printing apparatus of the calculated reception-side charge and the calculated execution-side charge.

21. An information management method in accordance with claim 20, wherein said step (b) carries out the calculation with regard to each administrator of the respective printing apparatuses at preset time intervals.

22. An information management method in accordance with claim 20, wherein the job reception information includes job reception apparatus identification information for identifying a printing apparatus receiving each print job, the job execution information includes job execution apparatus identification information for identifying a printing apparatus executing each print job, the job details information includes at least one of a size of printing paper, a type of printing paper, and a type of ink, and said step (b) specifies a job fee of each print job according to at least one of the size of printing paper, the type of printing paper, and the type of ink, calculates the reception-side charge based on a summation of products of job fees of respective print jobs received with regard to each piece of the job reception apparatus identification information and a preset reception-side division, and calculates the execution-side charge based on a summation of products of job fees of respective print jobs executed with regard to each piece of the job execution apparatus identification information and a preset execution-side division.

23. An information management method in accordance with claim 22, said information management method, before said step (b), further comprising the steps of:

(e) calculating a reception-side profit distribution as a division of a profit produced by execution of each print job to the administrator of the printing apparatus receiving the print job and an execution-side profit distribution as a division of the profit to the administrator of the printing apparatus executing the print job at a preset profit ratio, based on the job reception information, the job execution information, and the job details information; and (f) calculating a reception-side cost distribution as a division of a cost of the expendable consumed by execution of each print job to the administrator of the printing apparatus receiving the print job and an execution-side cost distribution as a division of the cost to the administrator of the printing apparatus executing the print job at a preset cost ratio, based on the job reception information, the job execution information, and the job details information, wherein said step (b) calculates the reception-side charge based on a grand total of the calculated summation of the products of the job fees of the respective print jobs received with regard to each piece of the job reception apparatus identification information and the preset reception-side division, a sum of the reception-side profit distributions, and a sum of the reception-side cost distributions, while calculating the execution-side charge based on a grand total of the calculated summation of the products of the job fees of the respective print jobs executed with regard to each piece of the job execution apparatus identification information and the preset execution-side division, a sum of the execution-side profit distributions, and a sum of the execution-side cost distributions.

24. An information management method in accordance with claim 20, said information management method further comprising the step of:

outputting a supply instruction of the expendable to the multiple printing apparatuses, based on the received expendable consumption information.

25. A Computer readable medium storing a computer program, said computer program causing a computer to receive expendable consumption information regarding an expendable consumed by multiple printing apparatuses and thereby to manage a consumption status of the expendable in the multiple printing apparatuses, the multiple printing apparatuses being located at different places and being capable of receiving a print job and of transferring the received print job via a communication line for execution, said computer program comprising:

(a) a module that receives job reception information regarding reception of print jobs by the multiple printing apparatuses, job execution information regarding execution of print jobs by the multiple printing apparatuses, and job details information regarding details of the print jobs received by the multiple printing apparatuses;

(b) a module that calculates a reception-side profit distribution as a division of a profit produced by execution of each print job to an administrator of a printing apparatus receiving the print job and an execution-side profit distribution as a division of the profit to an administrator of a printing apparatus executing the print job at a preset profit ratio, based on the job reception information, the job execution information, and the job details information; and (c) a module that notifies each corresponding printing apparatus of the calculated reception-side profit distribution and the calculated execution-side profit distribution.

26. A Computer readable medium storing a computer program, said computer program causing a computer to receive expendable consumption information regarding an expendable consumed by multiple printing apparatuses to manage charging to the multiple printing apparatuses, the multiple printing apparatuses being located at different places and being capable of receiving a print job and of transferring the received print job via a communication line for execution, said computer program comprising:

(a) a module that receives job reception information regarding reception of print jobs by the multiple printing apparatuses, job execution information regarding execution of print jobs by the multiple printing apparatuses, and job details information regarding details of the print jobs received by the multiple printing apparatuses;

(b) a module that calculates a reception-side charge as charging to an administrator of a printing apparatus receiving each print job and an execution-side charge as charging to an administrator of a printing apparatus executing the print job at a preset charging rate, based on the received job reception information, the job execution information, and the job details information; and (c) a module that notifies each corresponding printing apparatus of the calculated reception-side charge and the calculated execution-side charge.

* * * * *